United States Patent [19]

Hasegawa et al.

[11] 4,449,277
[45] May 22, 1984

[54] MACHINE TOOL WITH A PALLET CHANGE FUNCTION

[75] Inventors: Toshifumi Hasegawa, Kariya; Norikazu Kanii, Chita, both of Japan

[73] Assignee: Toyoda Koki Kabushiki Kaisha, Kariya, Japan

[21] Appl. No.: 420,638

[22] Filed: Sep. 21, 1982

[30] Foreign Application Priority Data

Sep. 24, 1981 [JP] Japan ................. 56-149370

[51] Int. Cl.³ .......................... B23Q 41/02
[52] U.S. Cl. ..................... 29/33 P; 29/563; 198/345; 198/472; 269/56
[58] Field of Search ............ 29/33 P, 563, 568; 198/344, 345, 472; 269/13, 14, 56, 57

[56] References Cited

U.S. PATENT DOCUMENTS 2,903,120  9/1959  Thomas .................. 198/345
3,825,245  7/1974  Osburn et al. ........... 29/33 P X
4,090,287  5/1978  Selander ................ 29/568
4,181,211  1/1980  Nishimura et al. ........ 198/339

FOREIGN PATENT DOCUMENTS 53-13068  5/1978  Japan .
0623707   9/1978  U.S.S.R. .............. 29/33 P Primary Examiner—Z. R. Bilinsky
Attorney, Agent, or Firm—Oblon, Fisher, Spivak, McClelland & Maier

[57] ABSTRACT

A machine tool is provided with a double actuation hydraulic cylinder incorporated into a pallet clamp member, which is vertically movable for clamping and unclamping a work pallet onto and releasing it from a work table of the machine tool. The cylinder, in an extension operation, outwardly extends a first hollow rod and further extends a second rod telescopically from the first rod so as to present a first engaging member secured to the outer end of the second rod under a second engaging member of a work pallet on a pallet support. The pallet clamp member, when upwardly moved, establishes engagement of the first engaging member with the second engaging member, so that the subsequent retraction operation of the cylinder causes the work pallet to be transferred from the pallet support onto the work table.

5 Claims, 5 Drawing Figures

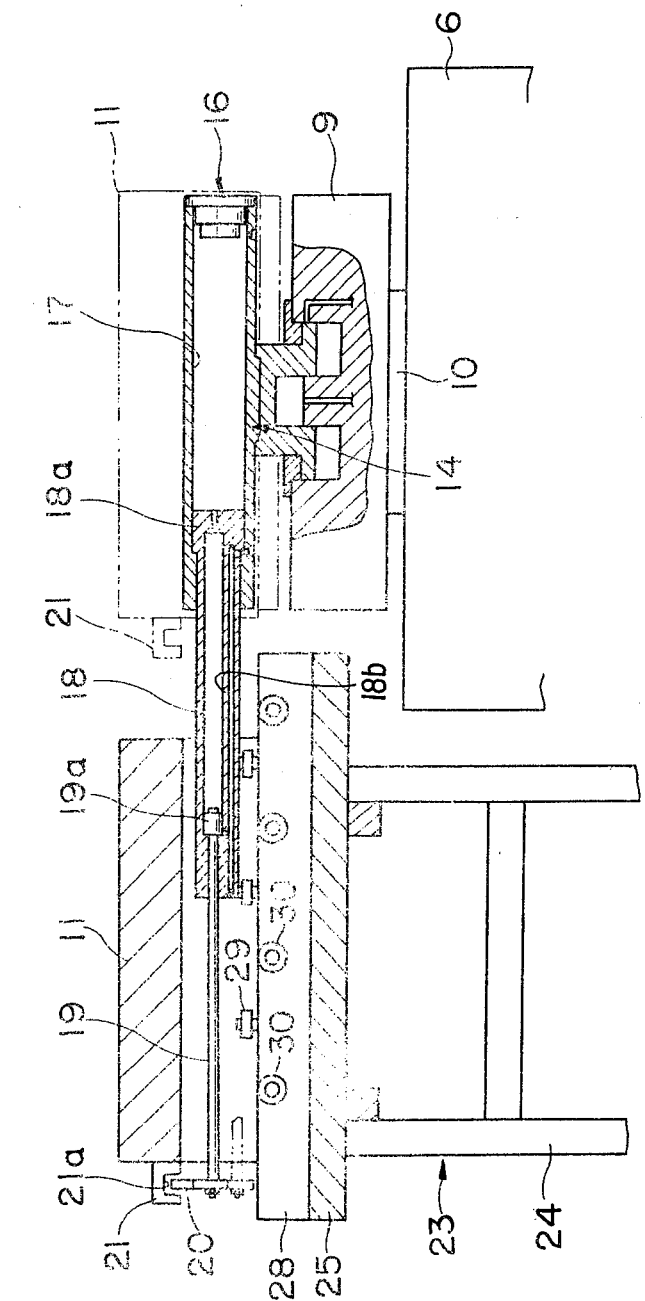

MACHINE TOOL WITH A PALLET CHANGE FUNCTION

BACKGROUND OF THE INVENTION

1. Field of the Invention

The present invention relates to a machine tool having a device for effecting the loading and unloading of workpiece set-up pallets between a work table of the machine tool and a pallet support stand disposed in the vicinity of the moving area of the work table.

2. Description of the Prior Art

In known pallet changers, a pair of support stands for slidably supporting pallets are provided on a base installed adjacent a machine tool table. One of the pallets is first unloaded from the table, which is positioned at an unloading station adjacent to one of the support stands, and the other pallet is then loaded onto the table after it has been positioned at a loading station adjacent to the other support stand. One type of the pallet changers is shown and described by Japanese published examined application No. 53-13068, wherein a single transfer device provided on a machine tool slide table performs both the loading and unloading operations. However, the provision of the transfer device on the slide table reduces the space available on the slide table, thereby imposing restraints upon workpieces to be set up on a rotary table which is rotatably mounted on the slide table. In addition, the pallet changer requires a device which, by pivotally moving an engaging member of the transfer device, releases the engaging member from engagement with a work pallet on the rotary table in order that the rotary table carrying the pallet can be rotated on the slide table.

Another type of the pallet changer has been proposed by co-pending U.S. application Ser. No. 289,221 filed on Aug. 3, 1981. This type is provided with first and second transport members, which are guided on a pallet support base installed adjacent a machine tool slide table. The transport members are selectively moved in a direction parallel to first and second pairs of support rails provided on the support base so that a pallet is transferred between an associated one of the first and second pairs of the support rails and the slide table positioned at a loading/unloading station adjacent thereto. The provision of a pair of clutches therein enables a single drive motor to selectively move the first and second transport members. However, there must be provided two sets of mechanisms each for transmitting to an associated one of the transport members driving power that is supplied from the drive motor through an associated one of the clutches.

SUMMARY OF THE INVENTION

It is therefore a primary object of the present invention to provide an improved machine tool capable of transferring, by a single, simple transfer device, a work pallet between a pallet support and a machine tool work table positioned at a predetermined position relative thereto.

Another object of the present invention is to provide an improved machine tool wherein a single transfer device is able to transfer a work pallet between a machine tool work table positioned at any of two positions which are different in the sliding direction of the work table and a corresponding one of two pallet supports which have a predetermined positional relation respectively with the two positions.

Still another object of the present invention is to provide an improved machine tool wherein a device for transferring a work pallet between a machine tool work table and a pallet support is diminished in size for accommodation into a member for clamping the work pallet on the work table.

Briefly, according to the present invention, there is provided a machine tool with a pallet change function which comprises a pallet clamp member, a pallet transfer device and a pallet clamp actuator. The pallet clamp member has a guide way for guiding a work pallet thereonto and is vertically movably mounted on a work table of the machine tool. The transfer device includes a rod means received in the clamp member for movement in a direction parallel with the guide way and first and second engaging members engageable with each other and respectively secured to the work pallet and one end of the rod means. The transfer device further includes a rod actuator provided in the pallet clamp member for moving the rod means between an extended position and a retracted position. The rod means, when at the extended position, presents the second engaging member under the first engaging member of the work pallet on a pallet support which is in the vicinity of the work table at a predetermined position. The rod means, when at the retracted position, presents the second engaging member under the first engaging member of the work pallet on the work table. The pallet clamp actuator vertically moves the clamp member to selectively clamp and unclamp the work pallet on and release it from the work table, as well as to selectively engage and disengage the second engaging member with and from the first engaging member.

With this configuration, the rod means and the rod actuator are accommodated in the clamp member, which advantageously results in effective use of space available on the work table. The accommodation of the rod means and the rod actuator in the clamp member makes it possible that the vertical movement of the clamp member is utilized to establish the engagement between the first and second engaging members.

In another aspect of the present invention, the rod means is constructed by first and second rods which are telescopically extensible and retractable with respect to each other. This is of great advantage in obtaining a longer transfer stroke between the work table and the pallet support.

BRIEF DESCRIPTION OF THE DRAWINGS

The foregoing and other objects and many of the attendant advantages of the present invention will be readily appreciated as the same becomes better understood by reference to the following detailed description, when considered in connection with the accompanying drawings, in which:

FIG. 5 is a sectional view similar to FIG. 2, but showing the parts in different relative positions.

DETAILED DESCRIPTION OF THE PREFERRED EMBODIMENT

Figure 1:
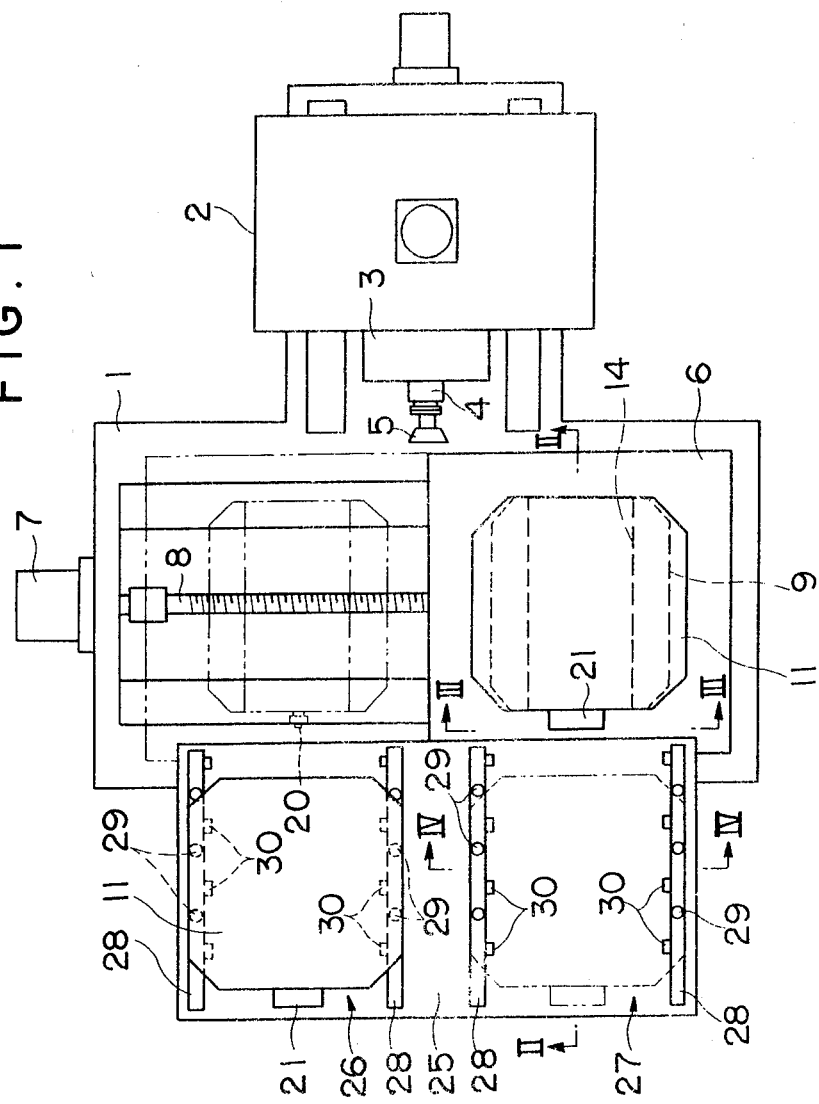
FIG. 1 is a plan view of a machine tool with a pallet exchange apparatus according to the present invention.

Referring now to the drawings, wherein like reference numerals or characters refer to identical or corresponding parts throughout the several views, and more particularly to FIG. 1, there is shown a bed 1 of a machine tool on a rear portion of which an upstanding column 2 is mounted to be movable in a horizontal direction. A spindle head 3 is carried by the column 2 to be movable in a vertical direction and rotatably supports a horizontal spindle 4. The spindle 4 removably supports a tool 5 at the front end thereof.

Figure 3:
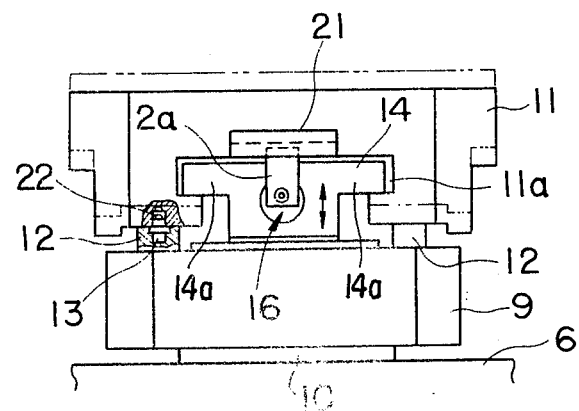
FIG. 3 is an enlarged front view, partly in section, as viewed along the line III—III in FIG. 1.
Figure 4:
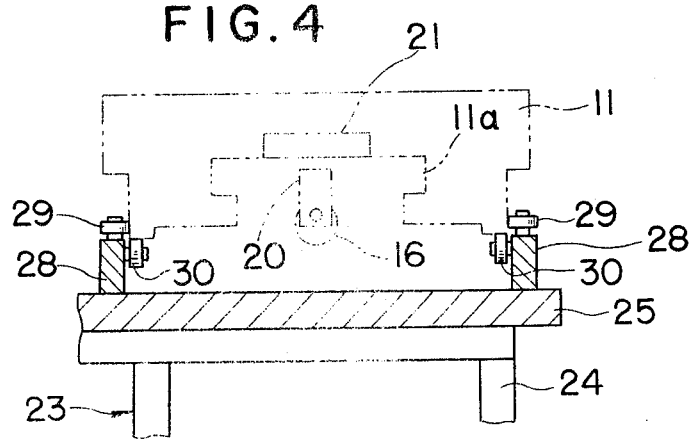
FIG. 4 is an enlarged sectional view taken along the line IV—IV in FIG. 1.

A slide table 6 is slidably mounted on the front portion of the bed 1 and is connected to a servomotor 7, fixed to the bed 1, through a feed screw shaft 8 for sliding movement in a horizontal direction transverse to the sliding direction of the column 2. As shown in FIG. 3, a rotary table 9 is supported by a vertical shaft 10 above the slide table 6 and is rotatable about the shaft 10 by means of a drive device, not shown. A number (e.g., four) of reference blocks 12 are mounted on the upper surface of the rotary table 9 approximately at four corners thereof for supporting a pallet 11 thereon. A positioning pin 13 upwardly protrudes from each of at least two of the reference blocks 12 for positioning the pallet 11. A clamp member or clamper 14 is disposed above the rotary table 9 between the reference blocks 12 and is movable in a vertical direction within a predetermined range by means of a cylinder mechanism 15 incorporated into the rotary table 9.

Figure 2:
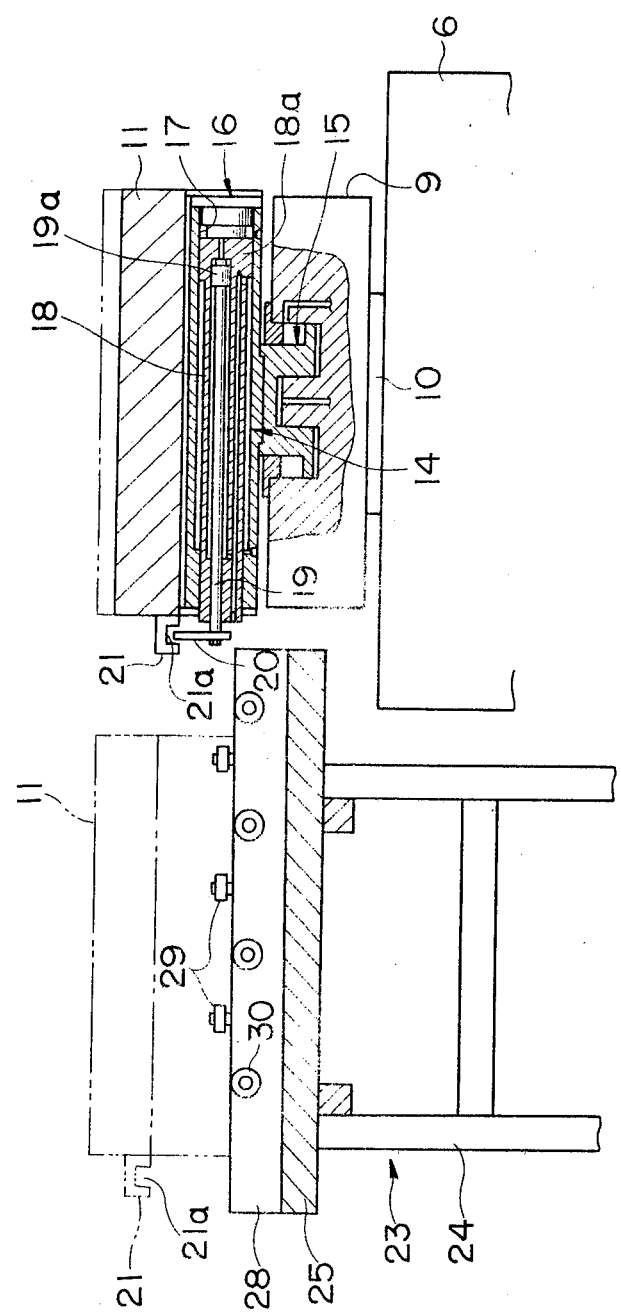
FIG. 2 is an enlarged sectional view taken along the line II—II in FIG. 1.

The clamper 14 is of T-shape in cross section and the pallet 11 has corresponding recesses 11a which are slidably engageable with projected head portions or pallet guide ways 14a, of the T-shaped clamper 14. Within the clamper 14 is formed a cylinder mechanism 16 for transferring the pallet 11. As shown in FIGS. 2 and 5, the cylinder mechanism 16 comprises a stationary cylinder 17 formed in the clamper 14, a slidable cylinder 18 having a slidable cylinder chamber 18b and a larger piston 18a at its one end which is slidably received in the stationary cylinder 17, a piston rod 19 having a smaller piston 19a at its one end which is slidably received in the slidable cylinder chamber 18b, and an engaging member 20 connected to the other end of the piston rod 19, so as to constitute a double cylinder wherein the slidable cylinder 18 and the piston rod 19 are telescopically movable in a direction away from and towards the column 2. The pallet 11 has at its side opposite to the column 2 an engaging member 21 formed with a recess 21a engageable with the engaging member 20 of the piston rod 19. The pallet 11 is also formed at its underside with at least two positioning holes 22 into which the positioning pins 13 are respectively receivable.

As shown in FIGS. 1, 2, 4 and 5, there is provided at the front of the bed 1 a pallet support device 23 which comprises a plurality of legs 24 mounted on the bed 1 or the ground, and a pallet support plate 25 fixed horizontally on the legs 24, on which a pallet loading station 26 and a pallet unloading station 27 are defined. Each of the pallet loading and unloading stations 26 and 27 is constituted by a pair of support rails 28 extending in a direction perpendicular to movement of the slide table 6, a plurality of guide rollers 29 supported on the support rails 28 to be rotatable about vertical axes for guiding the movement of the pallet 11 and a plurality of support rollers 30 supported by the support rails 28 to be rotatable about horizontal axes for slidably supporting the pallet 11.

The relationship between the clamper 14 and the pallet support device 23 is such that the height of the underside of the pallet 11 supported on the support rollers 30 is the same as that of the pallet 11 supported on the clamper 14 which reaches the uppermost or unclamped position thereof by the actuation of the cylinder mechanism 15. Furthermore, the relationship between the engaging members 20 and 21 is such that the engaging member 20 and the engaging member 21 of the pallet 11 with pallet 11 positioned on the clamper 14 or on the support rollers 30, are engaged with each other when the clamper 14 is in the unclamped position, while the engaging member 20 and the engaging member 21 of the pallet 11, with pallet 11 positioned on the support rollers 30, are disengaged from each other when the clamper 14 is at the lowermost or clamped position thereof.

In operation, under the state that the pallet 11 has mounted thereon an unfinished workpiece, not shown, pallet 11 is loaded onto the loading station 26, the servomotor 7 is first driven to move the slide table 6, thereby to align the clamper 14, in its clamped position with the pallet 11. The cylinder mechanism 16 is subsequently actuated to extend the slidable cylinder 18 and the piston rod 19 toward the pallet 11 on the loading station 26. Accordingly, the engaging member 20 connected to the piston rod 19 is positioned beneath the recess 21a of the engaging member 21. The cylinder mechanism 15 is then actuated to move the clamper 14 to its unclamp position, thereby moving the engaging member 20 into engagement with the recess 21a of the engaging member 21, as shown in FIG. 5. The cylinder mechanism 16 is subsequently actuated to retract the piston rod 19 and the slidable cylinder 18, so that the pallet 11 is transferred from the loading station 26 toward the rotary table 9 and is brought into slidable engagment with the clamper 14. When the cylinder mechanism 16 is deactivated, the pallet 11 is located at a predetermined position on the rotary table 9. The cylinder mechanism 15 is then actuated to lower the clamper 14, thereby to lower the pallet 11 onto the reference blocks 12, whereby each of the positioning pins 13 is inserted into a corresponding positioning hole 22 of the pallet 11 to position the pallet 11. Finally, the pallet 11 is clamped by the pallet guide ways 14a of the clamper 14, as shown in FIGS. 2 and 3.

The slide table 6 is then moved by means of servomotor 7 cooperating with feed screw shaft 8 to locate the workpiece, not shown, on the pallet 11 at a machining position to be machined by the tool 5 held on the spindle 4. It is to be noted here that the workpiece may be machined by various kinds of tools at various points by exchanging the tool 5 through the operation of an automatic tool change apparatus, not shown, and indexing the rotary table 9.

After the machining operation is completed on the workpiece, the rotary table 9 is rotated back to its original angular position, when having been rotated away from its original angular position, and the slide table 6 is moved to align the pallet 11 with the unloading station 27, as shown in FIG. 1. Subsequently, the cylinder mechanism 15 is actuated to move the clamper 14 to the unclamped position thereby to disengage the positioning hole 22 of the pallet 11 from the corresponding positioning pin 13 and to engage the engaging member 20 with the recess 21a of the engaging member 21. The cylinder mechanism 16 is actuated to extend the slidable cylinder 18 and the piston rod 19 so that the pallet 11 is transferred from the rotary table 9 to the unloading station 27. When the cylinder mechanism 16 is deactivated, the pallet 11 is located at a predetermined position on the unloading station 27. The cylinder mechanism 15 is then actuated to lower the clamper 14 thereby to disengage the engaging member 20 from the recess 21a of the engaging member 21. Finally, the cylinder mechanism 16 is actuated to retract the slidable cylinder 18 and the piston rod 19 to the rotary table 9 thereby to complete unloading of the pallet 11. It is to be noted here that loading of the pallet 11 into the loading station 26 and unloading of the pallet 11 from the unloading station 27 are carried out by conventional means.

According to the present embodiment, the cylinder mechanism 16 is constituted as a double cylinder mechanism, whereby the cylinder mechanism does not protrude from the rotary table 9 in moving the rotary table 9 mounting the pallet 11 thereon, which prevents interference of the cylinder mechanism 16 with other component parts. A loading/unloading stroke can also be made larger. Furthermore, engagement of the engaging member 20 with the recess 21a of the engaging member 21 of the pallet 11 on the rotary table 9 is established at the center of the clamper 14, whereby smooth loading and unloading of the pallet 11 onto and off of the rotary table 9 is possible without any excessive force being caused therebetween.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A machine tool with a pallet change function comprising:
    a machine frame;
    a tool spindle rotatably supported on said machine frame;
    a work table movable on said machine frame, relative to said tool spindle;
    a work pallet for supporting a workpiece thereon;
    a pallet clamp member having a pallet guide way for guiding said work pallet thereonto, said pallet clamp member vertically movably mounted on said work table for clamping and unclamping said work pallet onto and releasing it from the work table;
    pallet support means having first and second support stations for supporting said work pallet to be loaded onto said work table and for receiving said work pallet unloaded from said work table;
    positioning means for effecting relative movement between said work table and said pallet support means so as to establish a predetermined positional relation between said work table and a selected one of said first and second support stations;
    pallet transfer means for transferring said work pallet between said work table in said predetermined positional relation and said selected one of said first and second support stations, said pallet transfer means further comprising
    a rod means provided in said pallet clamp member and movable in a direction parallel with said pallet guide way;
    a first engaging member secured to said work pallet;
    a second engaging member secured to one end of said rod means and engageable with said first engaging member; and
    rod feed means provided in said pallet clamp member for moving said rod means between an extended and a retracted position such that in said extended position said second engaging member is positioned under said first engaging member of said work pallet on said selected one of said first and second support stations and in said retracted position said second engaging member is positioned under said first engaging member of said work pallet on said work table; and
    a clamp actuator provided in said work table for vertically moving said pallet clamp member so as to selectively clamp and unclamp said work pallet onto and releasing it from said work table and to selectively engage and disengage said second engaging member with and from said first engaging member of said work pallet on said selected one of said first and second support stations.

2. A machine tool as set forth in claim 1, wherein said rod means further comprises:
    a first rod received and guided in said clamp member and outwardly extensible therefrom; and
    a second rod received and guided in said first rod and telescopically extensible therefrom and having said second engaging member secured to an outer end thereof.

3. A machine tool as set forth in claim 2, wherein said rod feed means further comprises:
    a first hydraulic cylinder provided in said pallet clamp member and slidably receiving therein a piston connected to said first rod; and
    a second hydraulic cylinder formed in said first rod and slidably receiving therein a second piston connected to said second rod.

4. A machine tool as set forth in claim 3, wherein said positioning means further comprises means for selectively positioning said work table to first and second predetermined positions, and wherein said pallet support means comprises:
    a support base;
    a first guide way provided on said support base extending perpendicularly to a sliding direction of said work table and aligned with said pallet guide way of said pallet clamp member mounted on said work table when said work table is positioned at said first predetermined position; and
    a second guide way provided on said support base extending parallel to said first guide way and aligned with said pallet guide way of said pallet clamp member mounted on said work table when said work table is positioned at said second predetermined position
    such that said first and second guide ways define said first and second support stations, respectively.

5. A machine tool as set forth in claim 1, 2, 3 or 4, wherein said work table comprises:
    a slide table slidable on said machine frame relative to said tool spindle; and
    a rotary table mounted on said slide table for rotation about a vertical axis and vertically movably supporting said pallet clamp member.

* * * * *